United States Patent
Wolf et al.

(10) Patent No.: US 9,746,092 B2
(45) Date of Patent: Aug. 29, 2017

(54) VALVE ASSEMBLY, IN PARTICULAR FOR SPACE TRAVEL DRIVE SYSTEMS, WHICH IS CLOSED WHEN NOT ACTUATED

(71) Applicant: Airbus DS GmbH, Taufkirchen (DE)

(72) Inventors: Markus Wolf, Mannheim (DE); Thomas Maier, Lauffen (DE); Stephan Kraus, Oedheim (DE)

(73) Assignee: Airbus DS GmbH, Taufkirchen (DE)

( * ) Notice: Subject to any disclaimer, the term of this patent is extended or adjusted under 35 U.S.C. 154(b) by 80 days.

(21) Appl. No.: 14/642,865

(22) Filed: Mar. 10, 2015

(65) Prior Publication Data
US 2015/0260300 A1 Sep. 17, 2015

(30) Foreign Application Priority Data
Mar. 12, 2014 (DE) .................. 10 2014 003 261

(51) Int. Cl.
| F16K 31/00 | (2006.01) |
| F16K 17/40 | (2006.01) |
| F16K 31/02 | (2006.01) |

(52) U.S. Cl.
CPC ............ *F16K 17/403* (2013.01); *F16K 13/04* (2013.01); *F16K 31/002* (2013.01); *F16K 31/025* (2013.01); *Y10T 137/1692* (2015.04)

(58) Field of Classification Search
CPC ........ F16K 1/34; F16K 31/025; F16K 17/403; F16K 31/002; F16K 13/04; F03G 7/065; Y10T 137/1692
USPC ........ 137/68.11, 72, 76; 251/11, 66, 319, 68
See application file for complete search history.

(56) References Cited

U.S. PATENT DOCUMENTS

| 3,202,162 A * | 8/1965 | Eckardt ................... F16K 13/06 137/68.13 |
| 3,757,810 A * | 9/1973 | Covarrubias .......... A62C 13/76 137/68.13 |
| 4,126,151 A | 11/1978 | Bullerdiek |
| 5,960,812 A | 10/1999 | Johnson |
| 2013/0167377 A1 | 7/2013 | Gillespie |
| 2014/0261748 A1* | 9/2014 | Smith ..................... F16K 13/04 137/68.11 |

OTHER PUBLICATIONS

European Search Report issued in counterpart European Application No. 15000679.9-1751 dated Aug. 20, 2015, with Statement of Relevancy (Eight (8) pages).

* cited by examiner

*Primary Examiner* — Umashankar Venkatesan
(74) *Attorney, Agent, or Firm* — Crowell & Moring LLP

(57) ABSTRACT

A valve assembly includes an inlet and an outlet, which open into a working chamber of the valve assembly, and an actuator. In a non-actuated state of the actuator, a flow passage between the inlet and the outlet is blocked. The actuator is optionally a shape-memory actuator that can be actuated one time or comprises a shape-memory actuator, which suddenly changes its external shape upon reaching a conversion temperature, which is dependent on the alloy composition thereof, and which can be generated by a controllable electrical heating device of the valve assembly. The actuator irreversibly destroys a pipe element separating the inlet from the outlet in the working chamber upon actuation, whereby the inlet and the outlet are connected to one another with respect to flow via the working chamber.

18 Claims, 4 Drawing Sheets

Figure 1:
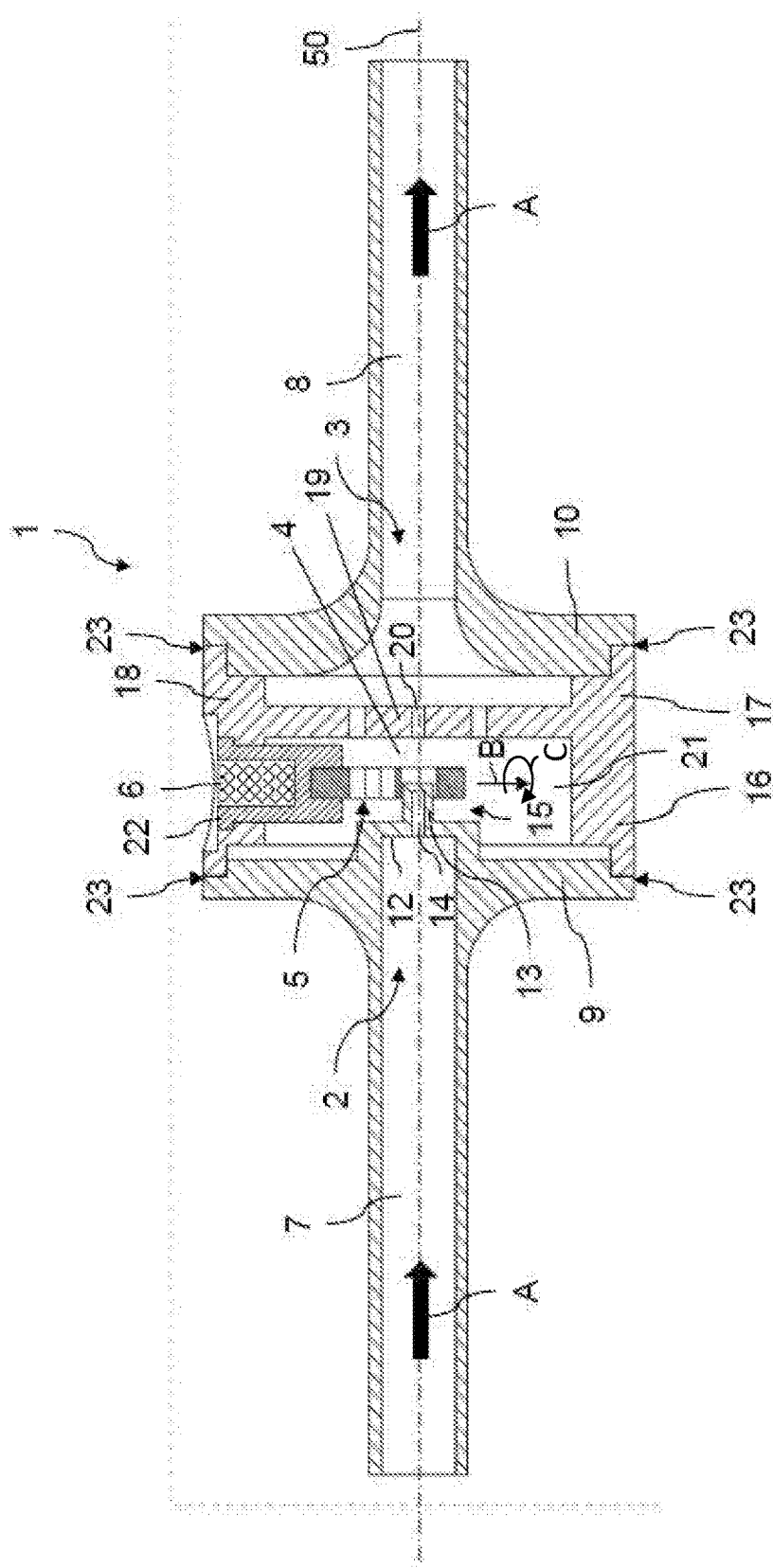

VALVE ASSEMBLY, IN PARTICULAR FOR SPACE TRAVEL DRIVE SYSTEMS, WHICH IS CLOSED WHEN NOT ACTUATED

CROSS-REFERENCE TO RELATED APPLICATIONS

The present application claims priority under 35 U.S.C. §119 to German application 10 2014 003 261.2, filed Mar. 12, 2014, the entire disclosure of which is herein expressly incorporated by reference.

BACKGROUND AND SUMMARY OF THE INVENTION

Exemplary embodiments of the invention relate to a valve assembly, which can be arranged in a pipeline for liquid or gaseous media. In particular, the invention relates to a valve assembly, which can be actuated one time, for a space travel engine. The valve assembly comprises an inlet and an outlet, which open into a working chamber of the valve assembly, and an actuator. In a non-actuated state of the actuator, a flow passage between the inlet and outlet is blocked, which means that the valve assembly is closed.

Valves are used in general where, for example, a pipeline for liquid or gaseous media must be opened or closed. In the closed state of the valve, a very low leakage rate must be ensured through it. Depending on the application, the valves can be provided for multiple actuations or also only for single actuation, wherein the latter is the case, for example, in drive systems for space travel applications.

A valve used in a drive system for space travel applications is used in satellites or space probes, for example, for connecting a closed hydraulic or pneumatic system to its environment. Such a valve must be closed in a non-actuated (activated) state. This state is referred to as "normally closed" (NC). Propellant or gas lines of a drive system, for example, can thus be passivated or depressurized at the end of a mission.

High demands are placed on the reliability of the activation in the case of space travel applications, since a malfunction can cause great damage or even the loss of the drive system.

Exemplary embodiments of the present invention are directed to a structurally and/or functionally reliable valve assembly for opening or closing a valve and a corresponding drive system for space travel applications.

Exemplary embodiments of the present invention provide a valve assembly for one-time actuation, which can be arranged in a pipeline for liquid or gaseous media. In particular, the valve assembly can be used in space travel engines. The valve assembly comprises an inlet and an outlet, and also an actuator. The inlet and the outlet open into a working chamber of the valve assembly. In a non-actuated (activated) state of the actuator, a flow passage between the inlet and the outlet is blocked. This means that the valve assembly is closed when the actuator is not actuated. The actuator is a shape-memory actuator, which can be actuated one time, or comprises a shape-memory actuator, which suddenly changes its external shape upon reaching a conversion temperature, which is dependent on its alloy composition, and which can be generated by a controllable electrical heating device of the valve assembly. The actuator irreversibly destroys a pipe element, which separates the inlet from the outlet, in the working chamber upon actuation, whereby the inlet and the outlet are connected to one another with respect to flow via the working chamber.

In other words, the pipe element is arranged in the working chamber and is destroyed therein to open the valve assembly.

The use of a shape-memory actuator as or in an actuator enables the one-time and irreversible activation, i.e., opening, of the valve. The activation is performed in that the shape-memory actuator is heated by the energy which is externally supplied, i.e., from the heating device, whereby the actuator changes its size (i.e., for example, expands), in particular suddenly and thus mechanically destroys the pipe element which separates the inlet from the outlet. The mechanical destruction of the pipe element can be performed according to a first variant by shearing off or according to a second variant by tearing or breaking the pipe element.

With the actuation by supply of thermal energy, the shape-memory actuator returns into its original shape. The supply of thermal energy up to or beyond a so-called transition temperature enables, for example, an expansion of the actuator while providing greater forces (in the range of several kilonewtons).

For example, a nickel-titanium alloy (NiTi) can be used for the shape-memory actuator. A typical transition temperature in the case of such shape-memory actuators is approximately 70° C. to 80° C. For space travel applications, it is fundamentally advantageous if a material having a higher transition temperature, for example, between 100° C. and 120° C., is used. Unintentional triggering of the actuator as a result of unfavorable boundary conditions can thus be prevented more reliably. The higher transition temperature can be achieved, for example, by pre-stressing the actuator and by alloying refractory metals or metals from the platinum group with the NiTi alloy.

The actuation function of the actuator can be provided with high reliability. No further mechanical or pyrotechnic elements are required to actuate, i.e., open the valve, in addition to the (shape-memory) actuator and the heating device, whereby the valve assembly has a simple mechanical structure, which is therefore robust. The valve assembly may be produced using few components and can have a low weight.

As a result, the valve assembly is similar in its function to a pyrotechnic valve, but has simpler activation and longer shelf life in relation thereto. In addition, the valve assembly does not have losses due to leakage before the activation (actuation).

According to the first variant, the inlet opens into a pipe element, which is arranged in the working chamber such that the pipe element is sheared off upon the actuation (i.e., activation) of the shape-memory actuator, whereby the inlet and outlet are connected to one another with respect to flow via the working chamber. Alternatively, the outlet can open into the pipe element arranged in the working chamber such that the pipe element is sheared off upon the actuation of the shape-memory actuator.

In one embodiment of the valve assembly, the shape-memory actuator at least sectionally adjoins the pipe element in the non-actuated state, whereby the shape change of the shape-memory actuator results in shearing off of the pipe element by the shape-memory actuator itself. Before the actuation, the shape-memory actuator can press against the pipe element or can have a small distance to the pipe element, for example. The shape change executed by the shape-memory actuator upon the actuation then results in the desired shearing of the pipe element.

In another embodiment of the valve assembly, one or more intermediate parts at least sectionally adjoin the pipe element in the non-actuated state, so that the shape change of the shape-memory actuator is transmittable to the intermediate part or parts, whereby the pipe element can be sheared off by at least one of the intermediate parts. The shape change of the actuated shape-memory actuator is transmitted to other components, wherein then one of the components carries out the shearing of the pipe element. This variant enables greater degrees of freedom in the design of the actuator. Thus, for example, a force transmission can be implemented and/or the volume of the actuator can be optimized. The intermediate part can be implemented, for example, in the form of a valve piston.

The pipe element can be arranged in a longitudinal direction of the valve assembly, wherein the force that can be generated by the shape-memory actuator extends transversely to the longitudinal direction. This generates maximum shear forces upon the actuation of the shape-memory actuator, whereby the reliability of the shearing operation is optimized. "Transversely" means that the force extends in a plane which is approximately perpendicular to the longitudinal direction.

The pipe element can be arranged in a longitudinal direction of the valve assembly, wherein the force that can be generated by the shape-memory actuator extends in a rotating manner about an axis which extends transversely to the longitudinal direction. "Transversely" also means here that the force extends in a plane which is approximately perpendicular to the longitudinal direction. The shearing off is performed by a rotational movement of the shape-memory actuator or an optional intermediate part. The actuator can already be connected in a friction-locked and/or formfitting manner to the pipe element for this purpose before the actuation. The actuator can have a (small) distance to the pipe element in the non-actuated state.

The working chamber can comprise a receiving volume for the sheared-off parts of the pipe element. The receiving volume can be located outside a main flow path of the gaseous or liquid medium, so that parts which are sheared off by the actuation of the (shape-memory) actuator are not drawn in the direction of the outlet and do not clog it or reach the outside under certain circumstances.

The pipe element can be formed by a pocket borehole of the inlet, which is introduced from a side facing away from the working chamber into a terminal base of the inlet. This enables simple manufacturing. It enables the simple establishment of the forces required for the shearing by way of the wall thickness of the pipe element remaining after the creation of the pocket borehole.

The base and the actuator or the base and one or more of the intermediate parts can be spaced apart from one another in the longitudinal direction. This ensures that after the shearing operation the opening created at the inlet is not closed by the actuator. Depending on the actuator embodiment, the actuator or the intermediate part can also be provided adjoining the base. It must be ensured by the actuator embodiment here that after the shearing operation, the opening created at the inlet is not closed by an actuator component.

The shape-memory actuator can be a spring or a sleeve, for example, which expands upon reaching the conversion temperature. The spring or sleeve can drive a bolt or a similar part, for example, by which the shearing is caused.

In a second variant, the pipe element can be formed by an extension of the inlet or the outlet, wherein the pipe element has a material weakening extending around the circumference, in particular a groove or notch, in the working chamber, wherein the pipe element is torn or broken upon the actuation of the actuator by a force acting in the direction of the actuation. According to this embodiment, the pipe element is not destroyed by shearing, but rather by a force acting in the direction of the pipe element. One advantage of this variant is that a component of the pipe element does not have to be captured by or after the destruction. The receiving chamber can thus be designed more compactly. The valve assembly can thus be provided with smaller volume. The material weakening represents an intended breakpoint of the pipe element.

According to one embodiment, a longitudinal axis of the pipe element and a longitudinal axis of the actuator are arranged coaxially to one another. The pipe element and the actuator are therefore arranged "one behind the other" or one inside the other.

According to a further embodiment, the actuator is tubular and has in its interior one or more components for transmitting the movement executed by the actuator upon the actuation to the pipe element. The component(s) for transmitting the movement executed by the actuator upon the actuation comprise a shaft which, when the actuator is not actuated, represent an extension of the pipe element. The actuator is mechanically connected to the shaft for transmitting a force, to cause the destruction at the intended breakpoint of the pipe element upon actuation.

The following embodiments can be used in both variants.

A screen can be arranged in the working chamber (from the viewpoint of the working chamber) in front of the outlet or in front of the inlet (if the outlet opens into the pipe element). The throughput of the gaseous or liquid medium can be adjusted by the screen when the valve is open.

The pipe element can be monolithically connected to the inlet or the outlet (if the outlet opens into the pipe element). In this way, the valve assembly has excellent leak tightness before the actuation of the actuator. The leak tightness is always provided in this case independently from the length of a period of time until an activation of the actuator. The monolithic, i.e., one-piece implementation of inlet or outlet and pipe element enables a seal seat and a valve element movable in relation thereto to be omitted. The structure of the valve assembly can thus also be kept simple.

The pipe element can have a cross section that is smaller or at most equally as large as the inlet or the outlet (if the outlet opens into the pipe element). The forces required for the shearing off or tearing can be established, for example, by the ratio of the diameter of pipe element and inlet or outlet. The smaller the diameter of the pipe element in relation to the inlet or outlet, the lesser the shearing forces which are required.

Furthermore, a drive system for a space travel application is provided, which has at least one valve assembly of the above-described type. The drive system has the same advantages as were mentioned in conjunction with the above-described valve assembly.

In summary, the forces released by activation of a shape-memory actuator be used for destroying a pipe element to provide an (evacuation) valve which can be actuated one time.

The inventive valve assembly has an array of advantages:
The valve assembly has a low level of complexity.
The valve assembly can be provided having a low mass, which encourages the use in space travel applications.
The valve assembly has excellent leak tightness before actuation over an arbitrarily long period of time because of the design. This is enabled, for example, by the monolithically implemented inlet having the pipe element.

The valve assembly has a reliable function, which can be implemented in a manner designed for high-pressure applications by way of the dimensions of the pipe element (for example, in the form of a capillary pipe which is to be destroyed by shearing or by way of the embodiment of the intended breakpoint).

The valve assembly enables easy dimensioning ability for a required mass stream in the open state.

The valve assembly has a long service life, since a pyrotechnic charge having limited lifetime can be omitted. No induction of a pyrotechnic shock during the actuation of the valve assembly results in conjunction therewith.

Low demands are placed on control electronics, in particular no valve drivers or additional controllers are required.

Low demands exist on environmental conditions during the storage, in particular relaxed temperature demands in comparison to pyrotechnic valves.

The valve can therefore result in substantial additional value in a drive system due to its construction-related advantages in contrast to the valves currently used in space travel applications, in particular at the end of the mission for passivation of a satellite drive system.

BRIEF DESCRIPTION OF THE DRAWING FIGURES

Figure 2:
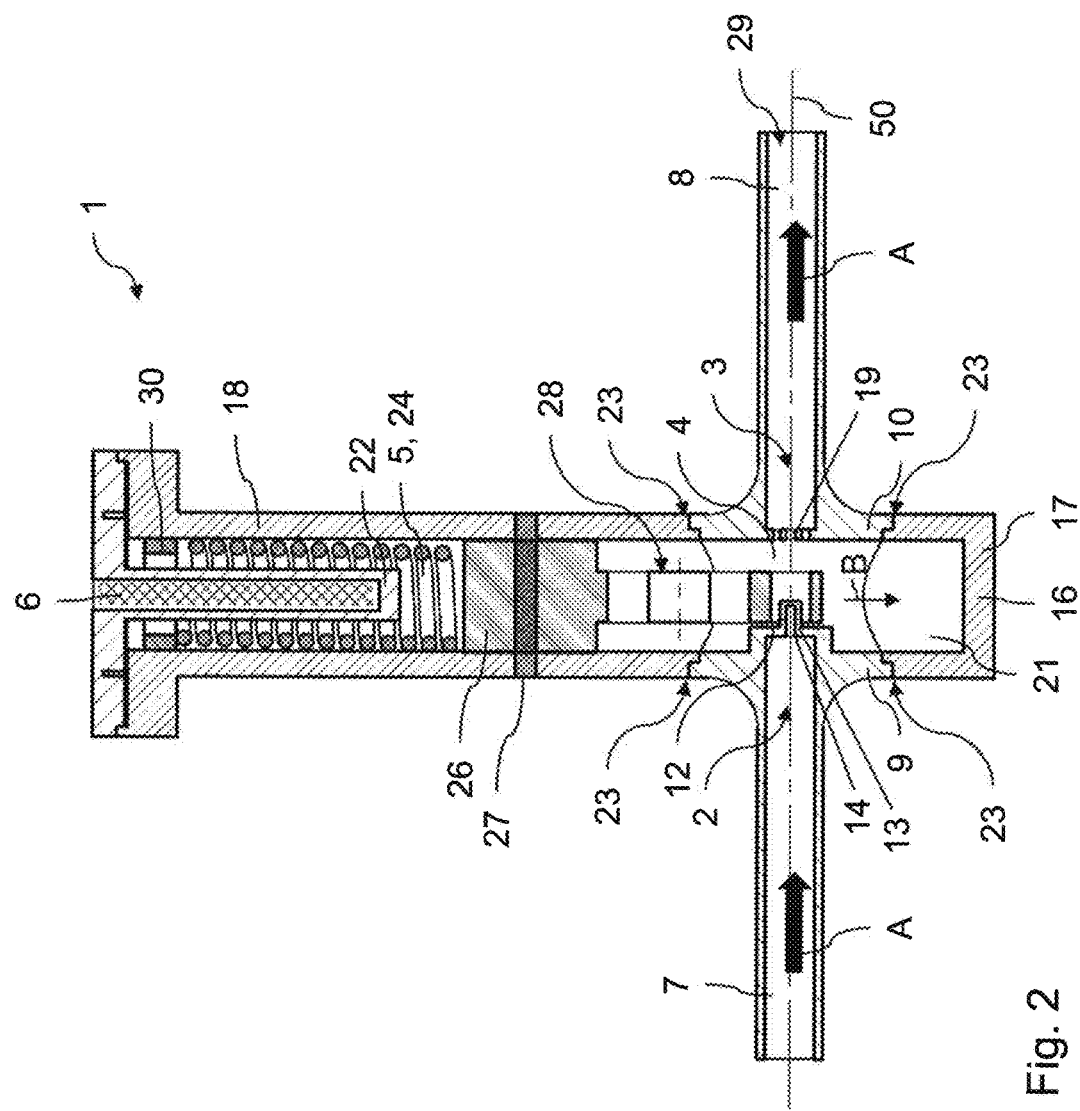
Figure 3:
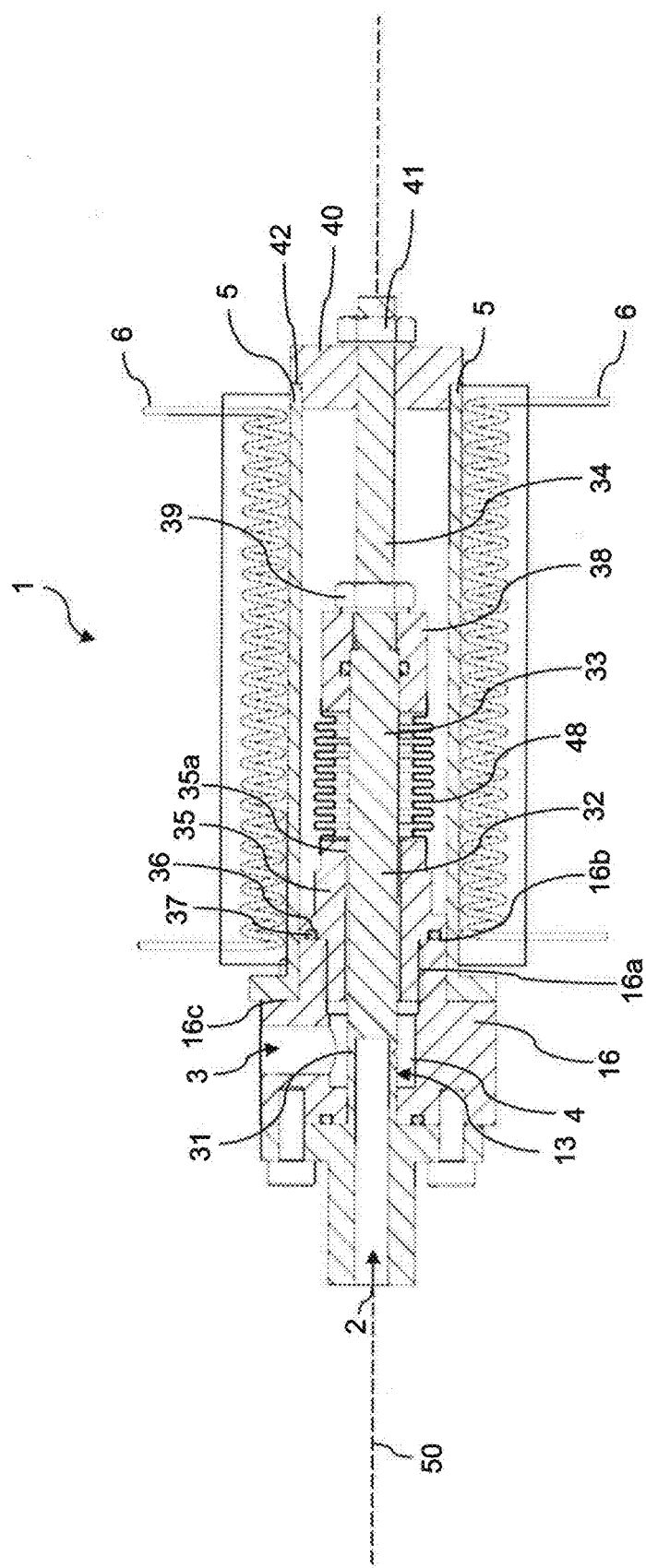
Figure 4:
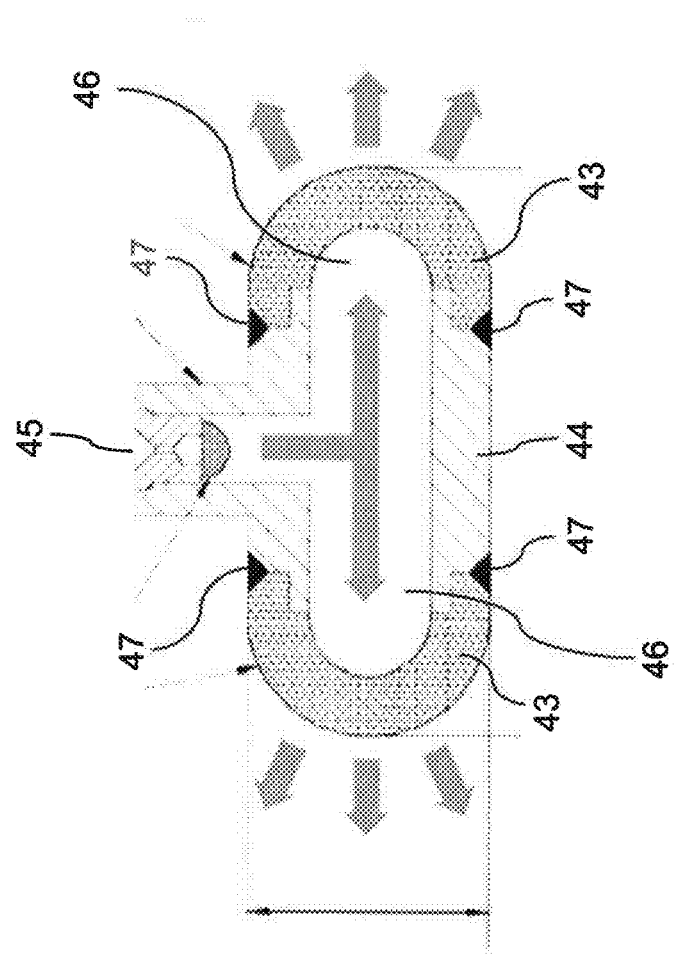

The invention will be described in greater detail hereafter on the basis of an exemplary embodiment in the drawing. In the figures:

FIG. 1 illustrates a first exemplary embodiment of a valve assembly according to the invention according to a first variant, in which an actuator is formed by a shape-memory actuator, FIG. 2 illustrates a second exemplary embodiment of a valve assembly according to the invention according to the first variant, in which the actuator comprises a shape-memory actuator, FIG. 3 illustrates an exemplary embodiment of a valve assembly according to the invention according to a second variant, in which an actuator is formed by a shape-memory actuator, and FIG. 4 illustrates an exemplary embodiment of a so-called "zero thrust" nozzle, due to which no thrust arises upon opening of the valve assembly.

DETAILED DESCRIPTION

FIG. 1 shows a valve assembly 1 (in short: valve) according to the invention according to a first variant, the "switching state" of which is changeable one time by a shape-memory actuator 5. The valve can be used, for example, in drive systems for space travel applications, for example, to connect a closed hydraulic or pneumatic system to its surroundings in the case of satellites and space probes. The valve 1 is closed for this purpose in a non-actuated (activated) state. This state is referred to as "normally closed" (NC). FIGS. 1 and 2 show the valve according to the invention in the non-actuated state.

The inlet 2 is formed by an inlet pipe 7, and the outlet 3 is formed by an outlet pipe 8. The inlet pipe 7 can be or become connected to a further pipeline, for example, of a space travel engine (in general: a system). The outlet pipe 8 is connected to the surroundings with its end 29 facing away from the valve 1. The inlet pipe 7 and the outlet pipe 8 extend along a longitudinal axis 50. A respective valve side end of the inlet pipe 7 and the outlet pipe 8 opens into a working chamber 4 of the valve.

The inlet pipe 7 has, on a valve-side wall 12 (base), a pipe element 13 formed by a pocket borehole 14. Both the wall 12 and also the pipe element 13 are located in the interior of the working chamber 4 of the valve 1. The pipe element 13 has a smaller cross section than the inlet pipe 7. The pipe element 13 forms a shearing section. High operating pressures can be implemented due to the smaller cross section of the pipe element 13 in relation to the inlet pipe 7. The required shearing forces are established or kept sufficiently small at the same time. The pipe element 13 can be implemented as a capillary for this purpose, for example. The pipe element 13 and the inlet pipe 7 are implemented monolithically, i.e., in one piece. In the non-actuated (not actuated) state of the valve 1, the flow passage of the medium in the direction of the arrow A from the inlet 2 to the working chamber 4 is therefore blocked. The one-piece embodiment ensures very good leak tightness even over long periods of time.

The valve-side end of the outlet pipe 8 opposite thereto is connected to the working chamber 4 of the valve 1 with respect to flow. The valve-side end of the outlet pipe 8 is coupled via a screen 19, which is arranged in the working chamber 4, to the working chamber 4. A number of recesses 20, for example, in the form of boreholes, is provided in the screen 19. In the open state of the valve, the throughput of a gaseous or liquid medium which flows through the valve 1 can be established by the screen 19.

The working chamber 4 of the valve 1 is delimited by flanges 9, 10 of the inlet pipe 7 and the outlet pipe 8 and by a valve housing part 16, which comprises a base 17 and a cover 18. The entirety of the mentioned components represents a housing of the valve 1. The above-mentioned screen 19 is an integral component of the valve housing part 16 in this exemplary embodiment, but this is not required. The mentioned components can be welded to one another in the contact regions identified with the reference sign 23, to provide a gas-tight and fluid-tight interior.

It is obvious that the housing of the valve 1 can also be formed in another manner. In particular, it is not necessary for the lateral walls of the valve to be formed by the flanges 9, 10 of the inlet and outlet pipes 7, 8. Instead, the housing of the valve 1 can also be produced separately from the pipes 7, 8.

A heat exchanger 22 is led into the interior of the working chamber 4 through the cover 18 of the valve housing part 16. A heating device 6, which is connected to a voltage source (not shown) and heats the heat exchanger 22 in operation, is arranged in the interior of the heat exchanger 22. The heat exchanger 22 is connected in a heat-conductive manner to the shape-memory actuator 5. The shape-memory actuator 5 extends in the plane of the drawing perpendicularly to the longitudinal axis 50, wherein it encloses the pipe element 13 in the exemplary embodiment shown. In this case, a spacing 15 (solely optional) is formed between the side of the base 12 of the inlet pipe 7 facing toward the working chamber 4 and the shape-memory actuator 5.

In the exemplary embodiment shown in FIG. 1, the valve 1 is actuated directly by the shape-memory actuator 5. This means that the shape change of the shape-memory actuator 5 results directly in shearing of the pipe element 13.

To open the valve 1, the shape-memory actuator 5 is heated by means of the heating device 6. Upon reaching the conversion temperature, which is dependent on the alloy of the shape-memory actuator 5, a sudden shape change of the shape-memory actuator 5 occurs, which is used to shear the pipe element 13. Depending on the embodiment of the shape-memory actuator 5, this movement can occur along the arrow B in the plane of the drawing perpendicularly to the longitudinal direction 50. A lateral, rotating movement along the arrow C, which shears off the pipe element 13, would also be conceivable.

After the opening of the valve, the pipe element 13 is disconnected from the base 12 of the inlet pipe 7, whereby a flow passage is provided between the inlet pipe 7 and the working chamber 4. A medium to be discharged can now flow from the inlet pipe 7 via the working chamber 4 through the outlet pipe 8 until the system (not shown) connected to the inlet pipe 7 is at ambient pressure. The flow throughput of the medium can be limited by the optionally provided screen 19 in the interior of the working chamber 4 (or alternatively at the entry of the outlet pipe 8). The throughput is dependent on the size and number of the recesses 20 provided in the screen.

The sheared-off pipe element 13 falls into a receiving volume 21 on the base of the working chamber 4. The sheared-off parts thus remain in the interior of the working chamber 4. Since the receiving volume 21 has a lower level in comparison to the underside of the outlet pipe 8, the sheared-off parts of the pipe element 13 remain in the interior of the working chamber 4 and do not reach the outside downstream, i.e., in the direction of the outlet pipe 8. Clogging of the recesses 20 of the screen 19 or, if a screen is not provided, of the outlet pipe 8 can also be prevented by this configuration.

The spacing 15, which is formed in FIG. 1 between the side of the base 12 of the inlet pipe 7 facing toward the working chamber 4 and the shape-memory actuator 5, ensures that the shape-memory actuator 5 does not block the passage created after the shearing in the base 12 after it is actuated. This situation can also be prevented by design measures of the shape-memory actuator 5, so that the spacing (gap) 15 is not required.

The valve assembly according to the invention shown in FIG. 2 differs from the exemplary embodiment shown in FIG. 1 by way of an indirect actuation of the valve 1. The shape change of the shape-memory actuator 5 is generally transmitted indirectly via an intermediate part or an assembly, wherein one of the intermediate parts or the assembly takes over the shearing of the pipe element 13.

In the exemplary embodiment shown in FIG. 2, the shape-memory actuator 5 is embodied as a spring 24 as an example. The spring 24 is a coiled spring here, which encloses the heat exchanger 22. The spring 24 is arranged together with the heat exchanger in the housing part 18, which is tubular here. On an end facing away from the working chamber 4, the spring 24 is supported on a fixing plate 30, which is fixedly connected to the tubular housing part 18. The spring 24 is heated by the heating device 6, which is arranged in the interior of the heat exchanger 22 on a longitudinal axis of the spring 24. Upon reaching the conversion temperature, a shape change takes place, which results in an expansion of the spring 24 downward in the direction of the drawing. The force occurring in this case in the direction of the arrow B is transmitted to a valve piston 26 as the intermediate part 24. The valve piston 26 is connected to an extension part 28, which encloses the pipe element 13 and which extends from the valve piston 26 in the direction of the arrow B. To secure the valve piston 26 before the actuation of the shape-memory actuator 5, an optionally provided safety bolt 27 (as a further intermediate part) can be provided in the tubular housing part 18. As soon as the force occurring as a result of the sudden shape change of the shape-memory actuator 5 exceeds the shear resistance of the safety bolt 27, the valve piston 26 is set into motion in the arrow direction B and shears off the pipe element 13 at the end 12 of the inlet pipe 7.

After the opening of the valve 1, the medium to be discharged can now flow through the working chamber 4 and the outlet pipe 5, until the system (not shown) connected to the inlet pipe 7 is at ambient pressure. In this case, the throughput through the optionally provided screen 19 in the working chamber 4 or in the outlet pipe 8 can again be limited. The design of the working chamber 4 or the housing delimiting the working chamber 4 is again such that the sheared-off parts of the pipe element 13 remain in the interior of the working chamber 4 of the valve 1 and cannot escape outward or downstream.

If the proposed valve 1 is used for the passivation of systems of a space travel application, the medium flowing out of the outlet pipe 8 cannot generate forces and torques. This can be achieved by a so-called "zero force" outlet (not shown). A zero force outlet has one or more openings that enable symmetrical escape of the medium from the outlet pipe 8. No thrust vector or no torque which acts on the satellites or the space vehicle is thus generated. Alternatively, such a zero force outlet can be attached at a suitable point of a space travel component, which is then connected via a pipe to the outlet of the valve.

FIG. 3 shows an exemplary embodiment of a valve assembly according to the invention according to a second variant. The valve assembly 1 comprises an inlet 2 and an outlet 3. In the present exemplary embodiment, the inlet 2 extends in the direction of the longitudinal axis 50. Solely as an example, the axis of the outlet 3 lies in a plane which is arranged perpendicularly to the longitudinal axis 50. The outlet 3 opens into the working chamber 4, which is enlarged in relation to the cross section of the outlet 3.

The pipe element 13 is formed by an extension of the inlet 2, wherein the pipe element 13 comes to rest in the working chamber 4 in this case. The pipe element 13 and the inlet 2 have an equal internal diameter, wherein this is not required. A material weakening 31 in the form of a V-shaped notch is provided extending around the circumference on the outer circumference of the pipe element 13. This represents an intended breakpoint. The pipe element 13 merges along the longitudinal axis 50 into a shaft 32. The shaft 32 comprises a first, thick shaft section 33 and a second, thin shaft section 34. The external diameter of the first shaft section 33 corresponds in this case to the external diameter of the pipe element 13 in the working chamber 4.

The first shaft section 33 extends through a borehole 35a of a housing part 35. The first shaft section 33 can slide in the borehole 35a or at least move along the longitudinal axis 50. The housing part 35 has a radially extending flange 36, which rests on a support surface 16b of the valve housing part 16. The housing part 35 partially plunges into a borehole 16a of the valve housing part 16. A seal 37 is arranged between the housing part 35 and the support surface 16b.

The step formed between the first, thick shaft section 33 and the second, thin shaft section 34 is connected to a terminus part 38. As is apparent from FIG. 3, the shaft 32 extends through the terminus part 38. Furthermore, a nut 39 is guided over the second, thin shaft section 34, which ensures that the terminus part 38 is pressed against the step formed between the shaft sections 33, 34. The second, thin shaft 34 is provided for this purpose with a corresponding external thread. The nut 39 is secured with securing wire for a space travel application. The nut 39 can also be replaced by a welded bond.

A media separation element in the form of an elastic bellows 48 can be provided between the terminus part 38 and the housing part 35. The bellows, which revolves around a part of the first, thick shaft section 33 in this case, is connected to the terminus part 38 and the housing part 35 to form a seal.

If an actuator 5 is joined, for example, by a welded bond to the valve housing part 16 and the terminus part 40, either the folded bellows can be omitted, or the hermetic welded bond represents a second barrier to the outside, which represents a redundancy in the case of failure of the folded bellows.

A terminus part 40 is provided on the outer, free end of the second, thin shaft section 34, through which the second, thin shaft section 34 extends. The terminus part 40 has a peripheral support surface 42 on the side facing toward the valve. A tubular shape-memory actuator 5 is provided between the support surface 42 and a support shoulder 16c of the valve housing 16. This support surface can be hermetically sealed by means of a welded bond. A heating device 6 is arranged on the outer circumference side. For example, the heating device 6 is constructed in FIG. 3 from two separately heatable heating circuits, which are located on opposite sides of the tubular actuator 5. It is clear to a person killed in the art that the heating device 6 could also be formed by a single heating coil or another number of heating coils.

To ensure that the actuator 5 is fixedly clamped between the support shoulder 16c and the support surface 42 of the terminus part 40, the terminus part 40 is fixed via a nut 41, which engages in the second, thin shaft section 34. This nut 41 can be secured using securing wire for a space travel application, for example. It can also be replaced by a welded bond.

If the heating device is now activated, the actuator 5 thus begins to expand after reaching its transition temperature. Since the actuator 5 introduces the force resulting because of the length change into the terminus part 40 due to the support on the shoulder 16c, the shaft 32 is moved to the right in the plane of the drawing, until finally the intended breakpoint (material weakening 31) suddenly tears. In this way, a passage is provided between the inlet 2 and the outlet 3 in the working chamber 4, so that ventilation of the volume connected to the inlet 2 can be achieved via the outlet.

To ensure that no thrust arises upon opening of the valve assembly 1, a so-called "zero thrust" nozzle can be connected to the outlet 3 of the exemplary embodiments shown in FIGS. 1 to 3. This is shown as an example in FIG. 4. An inlet channel 45 is connected in this case to the outlet 3 of the valve arrangement 1. The nozzle is connected to a T-piece 44 at the flow outlet. A respective end of the T-piece 44 represents an outlet channel 46. Spherical half shells 43 made of a porous material are connected to the outlet channels 46. The connection between the half shells 43 and the T-piece 44 can be implemented via a welded bond 47. It is ensured by the properties of the half shells 43 that the medium escaping via the nozzle escapes uniformly in all spatial directions, so that no thrust arises as a result. These half shells 43 can be manufactured from sintered metal, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 valve assembly
2 inlet
3 outlet
4 working chamber
5 (shape-memory) actuator
6 heating device
7 inlet pipe
8 outlet pipe
9 flange/shoulder of the inlet pipe 7
10 flange/shoulder of the outlet pipe 8
12 wall (base) of the inlet pipe 7
13 pipe element
14 pocket borehole
15 spacing between pipe element 13 and actuator 5 or intermediate part
16 valve housing part
16a borehole
16b support surface
16c shoulder
17 base
18 cover
19 screen
20 recess (borehole)
21 receiving volume
22 heat exchanger
23 weld
24 spring
26 valve piston (intermediate part)
27 securing bolt (intermediate part)
28 extension part (intermediate part)
29 exit-side end of the outlet pipe 8
30 fixing plate
31 material weakening (peripheral notch)
32 shaft
33 first, figure shaft section
34 second, thinner shaft section
35 housing part
35a borehole
36 flange
37 seal
38 terminus part
39 nut
40 terminus part
41 nut
42 support surface
43 gas-permeable porous half shell
44 T-piece
45 inlet channel
46 outlet channel
47 welded bond
48 bellows
50 longitudinal axis
A flow direction of a gaseous or liquid medium
B movement direction of the actuator

What is claimed is:

1. A one-time actuated valve assembly, comprising:
   an inlet;
   an outlet;
   a working chamber arranged between the inlet and outlet and into which the inlet and outlet open into, wherein the inlet and outlet can be arranged in a pipeline for liquid or gaseous media; and an actuator, which in a non-actuated state blocks a flow passage between the inlet and the outlet, wherein the actuator is a shape-memory actuator actuatable once or comprises a shape-memory actuator, which suddenly changes its external shape upon reaching a conversion temperature that depends on an alloy composition of the shape-memory actuator, and which can be generated by a controllable electrical heating device of the valve assembly, wherein the actuator is arranged within the valve assembly so that actuation of the actuator irreversibly destroys a pipe element, in the working chamber, separating the inlet from the outlet, wherein an inner diameter of the pipe element is smaller than an inner diameter of the inlet, wherein the pipe element is formed by an extension of the inlet or the outlet, wherein the pipe element has a material weakening extending around the circumference in the form of a groove or notch in the working chamber, wherein the pipe element is torn or broken upon the actuation of the actuator by a force acting in the direction of the actuation, and wherein a longitudinal axis of the pipe element and a longitudinal axis of the actuator are coaxially arranged.

2. The valve assembly of claim 1, wherein the inlet or the outlet opens into the pipe element, which is arranged in the working chamber such that the pipe element is sheared off upon the actuation of the shape-memory actuator.

3. The valve assembly of claim 2, wherein the shape-memory actuator at least sectionally adjoins the pipe element in the non-actuated state, wherein the shape change of the shape-memory actuator results in shearing off of the pipe element by the shape-memory actuator itself.

4. The valve assembly of claim 1, wherein one or more intermediate parts at least sectionally adjoin the pipe element in the non-actuated state, so that the shape change of the shape-memory actuator is transmittable to the intermediate part or parts, wherein the pipe element can be sheared off by at least one of the intermediate parts.

5. The valve assembly of claim 1, wherein the pipe element is arranged in a longitudinal direction of the valve assembly, wherein a force generated by rotational movement of the shape-memory actuator about an axis extending transversely to the longitudinal direction shears off the pipe element.

6. The valve assembly of claim 2, wherein the working chamber comprises a receiving volume for the sheared-off parts of the pipe element.

7. The valve assembly of claim 1, wherein the pipe element is formed by a pocket borehole of the inlet, which is introduced from a side facing away from the working chamber into a terminal base of the inlet.

8. The valve assembly of claim 7, wherein the base and actuator or the base and one or more of the intermediate parts are spaced apart from one another in a longitudinal direction.

9. The valve assembly of claim 1, wherein the shape-memory actuator is a spring, which expands upon reaching the conversion temperature.

10. The valve assembly of claim 1, wherein the actuator is tubular and has, in its interior, components for transmitting the movement executed by the actuator upon the actuation to the pipe element.

11. The valve assembly of claim 10, wherein the components for transmitting the movement executed by the actuator upon the actuation comprise a shaft, which is an extension of the pipe element when the actuator is not actuated.

12. The valve assembly of claim 1, wherein a screen is arranged in the working chamber in front of the outlet or the inlet.

13. The valve assembly of claim 1, wherein the pipe element is monolithically connected to the inlet or the outlet.

14. The valve assembly of claim 1, wherein the pipe element has a cross section that is smaller or at most as large as the inlet or the outlet.

15. A drive system for a space travel, the drive system comprising:
a pipeline carrying liquid or gaseous media; and
a one-time actuated valve assembly coupled to the pipeline, the one-time actuated valve assembly, comprising
an inlet;
an outlet;
a working chamber arranged between the inlet and outlet and into which the inlet and outlet open into, wherein the inlet and outlet can be arranged in a pipeline for liquid or gaseous media; and
an actuator, which in a non-actuated state blocks a flow passage between the inlet and the outlet,
wherein the actuator is a shape-memory actuator actuatable once or comprises a shape-memory actuator, which suddenly changes its external shape upon reaching a conversion temperature that depends on an alloy composition of the shape-memory actuator, and which can be generated by a controllable electrical heating device of the valve assembly,
wherein the actuator is arranged within the valve assembly so that actuation of the actuator irreversibly destroys a pipe element, in the working chamber, separating the inlet from the outlet,
wherein an inner diameter of the pipe element is smaller than an inner diameter of the inlet,
wherein the pipe element is formed by an extension of the inlet or the outlet, wherein the pipe element has a material weakening extending around the circumference in the form of a groove or notch in the working chamber, wherein the pipe element is torn or broken upon the actuation of the actuator by a force acting in the direction of the actuation, and
wherein a longitudinal axis of the pipe element and a longitudinal axis of the actuator are coaxially arranged.

16. The valve assembly of claim 2, wherein, a location where the pipe element is sheared off has a cross-section with an inner diameter which is less than the inner diameter of the inlet.

17. A drive system for a space travel, the drive system comprising:
a pipeline carrying liquid or gaseous media; and
a one-time actuated valve assembly coupled to the pipeline, the one-time actuated valve assembly, comprising
an inlet;
an outlet;
a working chamber arranged between the inlet and outlet and into which the inlet and outlet open into, wherein the inlet and outlet can be arranged in a pipeline for liquid or gaseous media; and
an actuator, which in a non-actuated state blocks a flow passage between the inlet and the outlet,
wherein the actuator is a shape-memory actuator actuatable once or comprises a shape-memory actuator, which suddenly changes its external shape upon reaching a conversion temperature that depends on an alloy composition of the shape-memory actuator, and which can be generated by a controllable electrical heating device of the valve assembly, wherein the actuator is arranged within the valve assembly so that actuation of the actuator irreversibly destroys a pipe element, in the working chamber, separating the inlet from the outlet, and wherein the pipe element is arranged in a longitudinal direction of the valve assembly, wherein a force generated by rotational movement of the shape-memory actuator about an axis extending transversely to the longitudinal direction shears off the pipe element.

18. The drive system of claim 17, wherein the pipe element is arranged in a longitudinal direction of the valve assembly, wherein a force generated by the shape-memory actuator extends transversely to the longitudinal direction.

* * * * *